Sept. 9, 1969　　　　　　　　　A. MALA　　　　　　　　3,465,645
POWER ASSISTED STEERING SYSTEMS OF AUTOMOTIVE VEHICLES
Filed Aug. 14, 1967　　　　　　　　　　　　　　　3 Sheets-Sheet 1

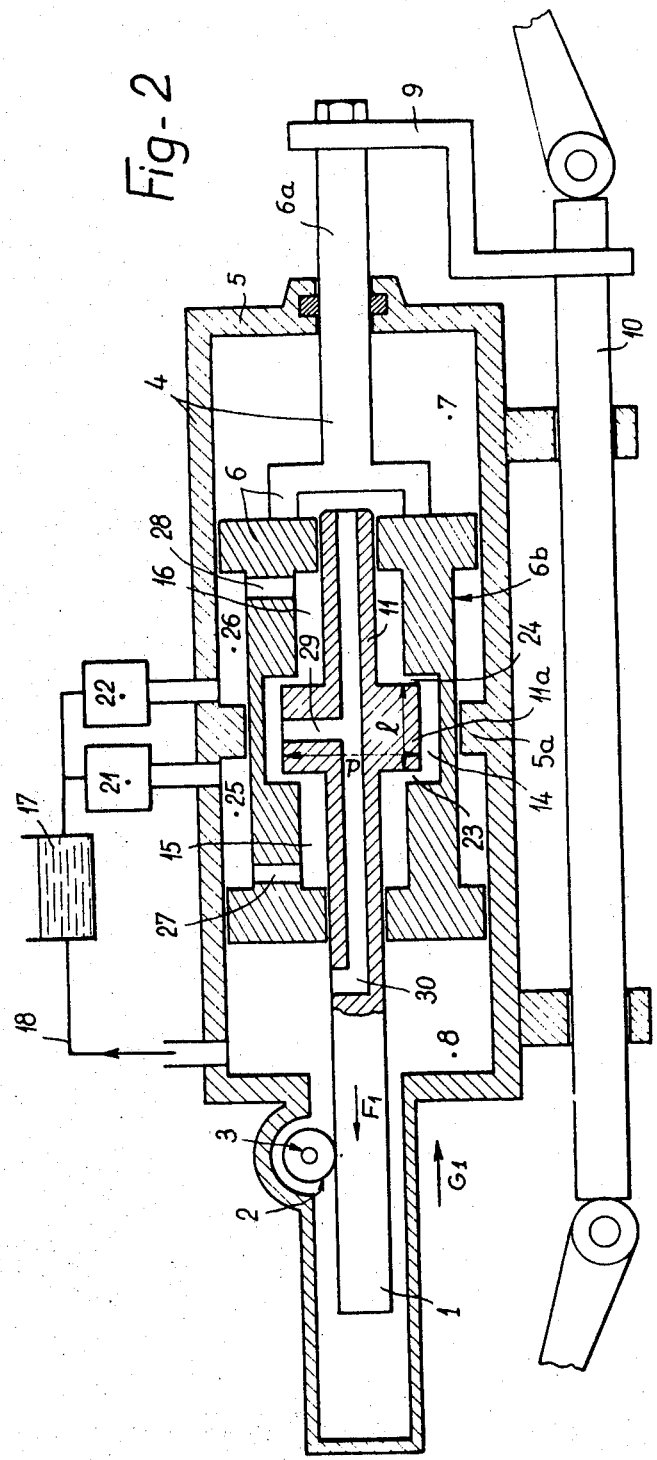

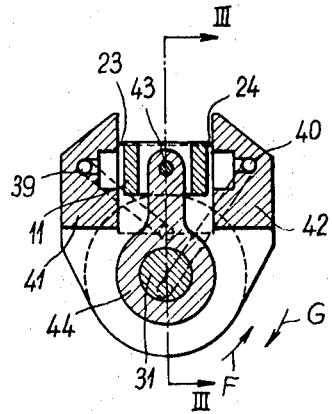
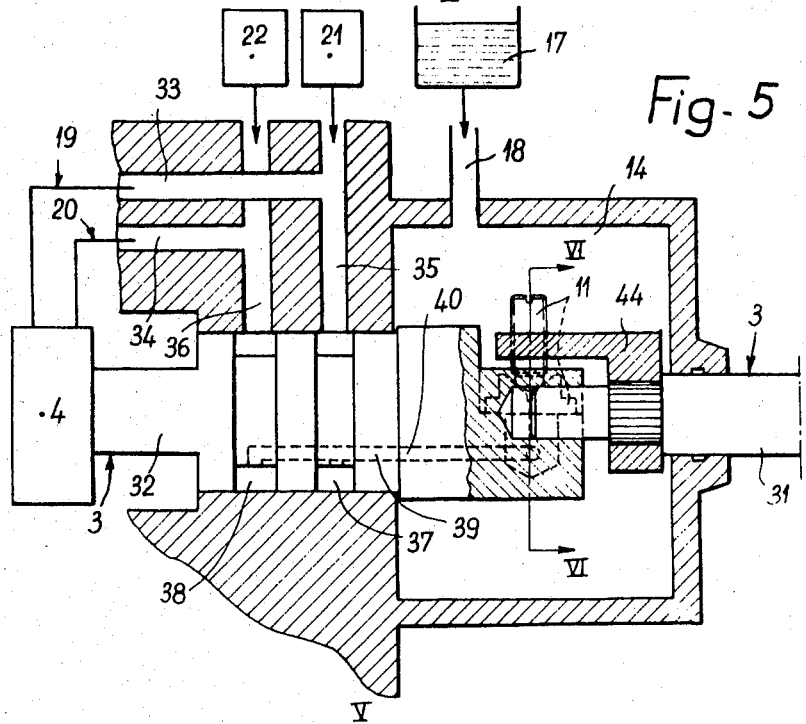
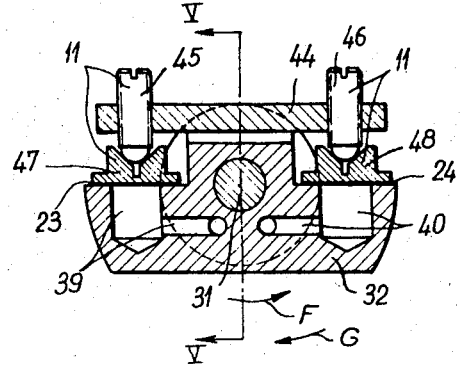

United States Patent Office 3,465,645
Patented Sept. 9, 1969

3,465,645
POWER ASSISTED STEERING SYSTEMS OF
AUTOMOTIVE VEHICLES
Alain Mala, Billancourt, France, assignor to Regie
Nationale des Usines Renault Billancourt, Hauts
de Seine, France
Filed Aug. 14, 1967, Ser. No. 660,363
Claims priority, application France, Sept. 16, 1966,
76,636
Int. Cl. F01b 7/20; B62d 5/08; F15b 9/10
U.S. Cl. 91—51                    4 Claims

ABSTRACT OF THE DISCLOSURE

A power-assisted steering system for an automotive vehicle comprising an input shaft connected to a steering wheel, an output shaft or member controlling a steering linkage, and a servo-action motor such as a double-acting actuator having its cylinder secured to the frame of the vehicle and fed by means of two pipe lines respectively for the fluid input and output, said steering system being characterised in that it comprises pipe lines connected to a pair of separate distributors for fluid under pressure and to a pair of ducts of which the opening is adjustable by means of a throttling member secured to said input shaft.

---

The present invention relates to servo-action or power-assisted steering systems for automotive vehicles and has specific reference to improvements in systems of this character.

It is an important object of the present invention to provide a steering system of the column type comprising an input shaft operatively connected to a steering wheel, an output shaft or like member coupled to linkage means, and a power-assisting motor, for example in the form of a slow rotary hydralic motor or a double-acting piston-and-cylinder unit or actuator having its cylinder secured to the frame structure of the vehicle and fed through a pair of pipe lines for the hydraulic fluid flowing to and from the cylinder respectively, this steering system being characterised essentially in that said pipe lines are connected to a pair of passages the opening of which is adjusted by means of a throttling member secured to the aforesaid input shaft.

This throttling member of which the sole function is to partially close ports or like orifices does not require any particular precision in its manufacture. Since on the other hand this throttling member is centered by the equilibrium of the static and dynamic pressures of the fluid acting upon each one of its opposite faces, it is not necessary to associate any return spring therewith, whereby its manufacture is also very economical.

In order to afford a clearer understanding of this invention and of the manner in which the same may be carried out in practice, reference will now be made to the accompanying drawings illustrating diagrammatically by way of example a few typical forms of embodiment of the invention.

In the drawings:

FIGURE 2 is a sectional view of a modified construction of the system illustrated in FIGURE 1;

FIGURE 4 is a section taken along the line IV—IV of FIGURE 3;

FIGURE 5 is a modified form of embodiment of the device illustrated in FIGURE 2, as seen in section taken along the line V—V of FIGURE 6, and FIGURE 6 is another section taken along the line VI—VI of FIGURE 5.

Figure 1:
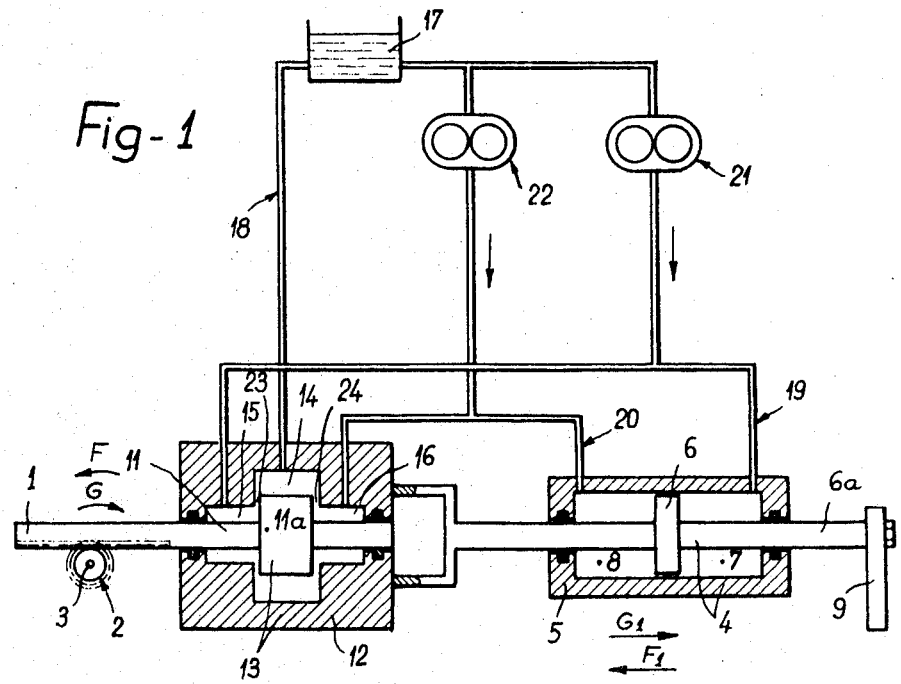
FIGURE 1 illustrates the basic diagram of the first form of embodiment of the power-assisted steering system of this invention.

Referring to FIGURE 1 of the drawing, it will be seen that a power-assisted or servo-action steering system for steering the road wheels (not shown) of an automotive vehicle comprises a rack 1, a pinion 2 meshing therewith and operatively connected to a steering wheel (not shown), by means of a steering column 3, and a servo-action actuator 4 comprising a cylinder 5 secured to the frame or body structure of the vehicle. A piston 6 having a rod 6a is slidably mounted in the cylinder 5 and divides the latter into two compartments 7 and 8; this piston rod 6a is coupled to a drop arm 9 adapted to steer the road wheels by means of linkage means 10 illustrated in diagrammatic form in FIGURE 2.

According to this invention, the rack 1 controls a throttling member 11 slidably mounted in the body 12 of a throttling valve 13, this body 12 being rigidly connected to the aforesaid piston 6 of the servo-action actuator 4. The throttling member has a central portion 11a of greater diameter dividing the inner space of the body 12 into a central chamber 14 and a pair of end chambers 15, 16 connected to a fluid reservoir 17 and also to the aforesaid compartments 7 and 8 of the servo-action actuator through the medium of pipe lines 18, 19 and 20.

Two pumps or pressure-fluid distributors 21 and 22 draw the fluid from reservoir 17 and supply separately the pipe line 19, chamber 15, compartment 7 on the one hand, and pipe line 20, chamber 16, compartment 8 on the other hand.

It will be noted that when the pinion 2 is rotated by means of the steering wheel (not shown) in the direction shown by the arrow F or G, the larger portion 11a of throttling member 11 reduces the cross-sectional areas of passages 23 or 24 existing between chambers 14, 15 or 14, 16.

The above-described device operates as follows:

Assuming that pinion 2 is rotated in the direction of the arrow G by turning the steering wheel (not shown), so as to cause a movement of translation of rack 1, the fluid passage 24 between the chamber 16 and the central exhaust chamber 14 is more or less throttled. Thus, the fluid pressure rises immediately in chamber 16 and this pressure is transmitted via the pipe line 20 to the compartment 8 of the actuator or servo-action device 4. The piston 6 of this actuator is thus pushed in the direction of the arrow $G_1$ and assists in turning the steering wheels. The piston 6 is rigidly connected to and drives the body 12 of the throttling valve, thus gradually eliminating the throttling effect and stabilizing the steering system in the position corresponding to the angular position of the steering wheel.

During the above-described movement the pressure fluid enclosed in compartment 7 of the actuator is forced through pipe line 19 and 18 into chamber 15, then into chamber 14 and eventually into the fluid reservoir 17.

The operation is exactly the same when the steering wheel is turned in the direction of the arrow F in order to move the rack 1 in the direction of the arrow $F_1$.

In a practical form of embodiment illustrated in FIGURE 2 the throttling valve, due to its reduced dimensions, may be mounted within the piston 6 of the double-acting cylinder unit or actuator 4. The cylinder 5 of this unit is formed in this case with an internal annular projection 5a substantially contacting a thinner wall portion 6b of the piston, which constitutes the body of said throttling member 11. The aforesaid circular internal projection 5a thus divides the space formed between the thinner wall portion 6b of piston 6 and the internal wall of said cylinder into two chambers 25 and 26 supplied with pressure fluid by said pumps 21 and 22. Ducts 27, 28 and 29, 30 are formed through the piston 6 and said throttling member 11 to provide a permanent communication between chambers 15 and 25, 16 and 26, and also between chamber 14 and the compartments 7 and 8 of the servo-action cylinder 5. As shown in FIGURE 2, one of these compartments, for example compartment 8, is connected via a pipe line 18 to the fluid reservoir 17.

The pumps 21 and 22 supply pressure fluid to the chambers 25 and 26 of the double-acting actuator. This hydraulic fluid flows through pipe lines 27 and 28 towards chambers 15 and 16 of the throttling valve, and then into the exhaust chamber 14. It further flows via duct 30 into chamber 8 and returns to the reservoir 17 via the pipe line 18. Under these conditions when the rack 1 is moved in the direction of the arrow $F_1$ the passage 23 between chambers 15 and 14 is throttled, thus causing the fluid pressure to rise upstream of chamber 14, notably in chambers 15 and 25. The pressure in chamber 25 produces the desired servo-action or power-assistance.

The piston 6 constituting at the same time the body of the throttling valve, is rigidly connected to the rod 6a transmitting the motion to the steering linkage 10. The compartment 7 is filled with hydraulic fluid at a relatively low pressure and recovers notably the leakages from chamber 26. This compartment 7 is exhausted and filled at low pressure via the duct 30 according to the movements of piston 6.

It will be seen that the construction of the throttling valve does not require any particular standard of precision, since relatively wide tolerances can be applied to dimensions such as the diameter $d$ and the length $l$ of the central larger portion 11a of the throttling member of this valve.

Neither are spring or like return means required on either side of this central portion of the throttling member, since said member 11 is returned quite naturally to its position of equilibrium by the static and dynamic pressures of the fluid flowing from chambers 15 and 16 to chamber 14.

From the above description it will readily occur to anybody conversant with the art that this valve construction is particularly economical.

However, it would not constitute a departure from the spirit and scope of the invention to constitute the central portion 11a as a cylindrical slide valve, although practical experience teaches that with the arrangement illustrated the pressure increment and therefore the servo-action or power-assisting effort are obtained with a shorter stroke of said central portion, and therefore with a smaller angular movement of the steering wheel, thus making steering much easier.

Figure 3:
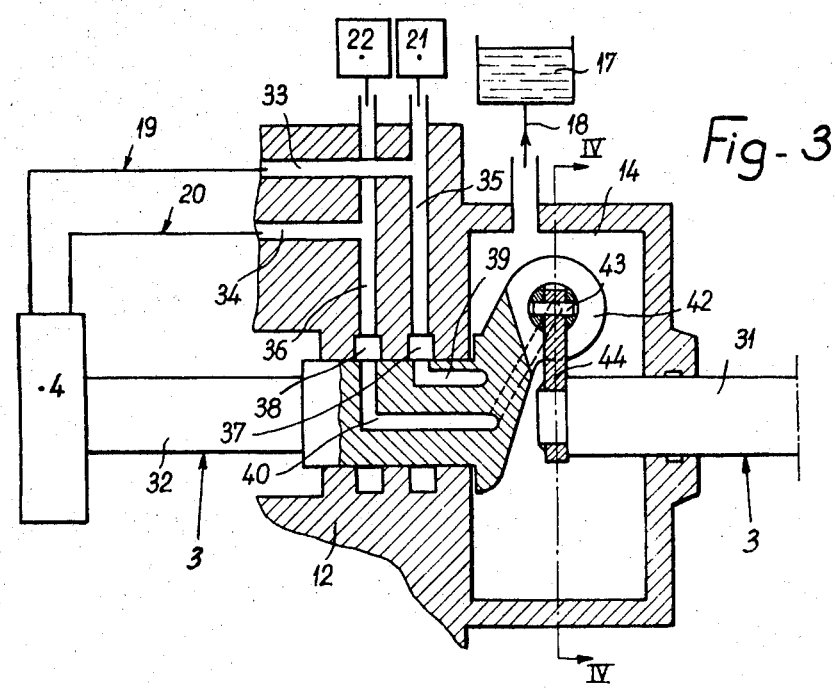
FIGURE 3 is another modification of the system but shown in axial section taken along the line III—III of FIGURE 4.

Also on account of the reduced dimensions of the throttling valve 13 this valve can be mounted directly on the steering column 3 (FIGURES 3 and 4). This column comprises in this case an input shaft 31 on which the steering wheel proper (not shown) is mounted, and an output shaft 32 associated with a servo-action motor or double-acting actuator 4, or to a slow-motion rotary hydraulic motor 4, for example, said shafts 31 and 32 being pivotally mounted in the body 12 of the throttling valve.

Duct means 33, 34, 35 and 36 formed in said body interconnect the pumps 21, 22 and the actuator or hydraulic motor 4, and also annular grooves 37, 38 formed in said body 12. Registering with these grooves are ports communicating with ducts 39 and 40 formed within the shaft 32 and also within two extensions 41, 42 (FIGURE 4) thereof which are located within the exhaust chamber 14. Both ducts 39 and 40 open into this chamber 14 and the extensions 41 and 42 of shaft 32 are disposed on either side of the throttling member 11 secured to shaft 31, thus providing between said extensions and said shaft two passages 23 and 24 for exhausting the hydraulic fluid flowing from ducts 39 and 40.

According to this invention, the hydraulic fluid from the pumps or distributors 21, 22 is fed via ducts 35 and 36 into the annular grooves 37 and 38 of body 12, and then flows into the ducts 39 and 40 of output shaft 32. The hydraulic fluid subsequently flows into chamber 14 through the aforesaid passages 23 and 24 formed beween the throttling member 11 and the extensions 41 and 42 of shaft 32. From chamber 14 the fluid is returned to the reservoir 17 via the pipe line 18. The throttling member 11 is connected by means of a pin 43 to a control arm 44 rigid with the input shaft 31 carrying the steering wheel (not shown).

When the driver turns this wheel in the direction of the arrow F, the hydraulic fluid is throttled at 23 but flows unobstructed through passage 24, thus producing an overpressure in the duct 39, groove 37, ducts 35, 32 and pipe line 19 supplying the servo-action motor 4.

Turning the steering wheel in the opposite direction (arrow G) will cause an overpressure to develop in pipe line 20. As explained hereinabove, the pipe lines 19 and 20 feed the servo motor 4 consisting for example of a double-acting hydraulic actuator (FIGURES 1 and 2) or a slow-motion rotary hydraulic motor. An overpressure in pipe line 19 cause the rotation in one direction, for example in the direction of the arrow F, of the motor 4 and of the output shaft 32 associated therewith, and an overpressure in pipe line 20 causes the rotation of shaft 32 in the opposite direction (arrow G).

In the alternate form of embodiment illustrated in FIGURES 5 and 6 of the drawings the arm 44 is provided with throttling valves 11 comprising an adjustment screw 45, 46 (FIGURE 6) and a valve 47, 48 adjusting the output through ducts 23 and 24 of the fluid flowing out from ducts 39 and 40.

Turning the steering wheel and therefore the input shaft 31 in the direction of the arrow F will cause the valve member 47 to engage the port communicating with duct 39, thus reducing or eliminating the duct 23. The resulting pressure increment in ducts 39, 35, 33 and in pipe line 19 causes the servo-motor 4 to rotate in the direction of the arrow F.

Of course, the operation of the assembly would be similar if the steering wheel were turned in the direction of the arrow G.

I claim:

1. A power-assisted steering system for automotive vehicles comprising a steering linkage, a fixedly mounted fluid-pressure cylinder having an internal annular projection, a piston movably mounted within said cylinder and forming two end chambers between respective ends of said cylinder and piston and two annual chambers between adjacent surfaces of said piston and cylinder and separated by said projection, means operatively connecting said piston to said steering linkage, two fluid pressure sources respectively connected to said annular chambers, rack and pinion control means, valve means fast with said rack, said valve means comprising a chamber formed in said piston and rod means slidably mounted in said piston chamber, a central valve portion formed on said rod forming in said piston two end annular chambers with an intermediate central chamber and bleed ports on either side of said valve portion, first passage means formed in said piston connecting said annular chambers and said end annular chambers, and second passage means formed in said valve member connecting said central chamber to said end chambers in the cylinder.

2. A steering system according to claim 1 in which said pinion is operatively connected to the steering wheel of the vehicle.

3. A steering system according to claim 1 in which said central valve portion extends within said central chamber of the piston so as to provide an axial thrust connection between said valve member and piston when either one of said bleed ports are closed.

4. A steering system according to claim 1 in which said piston further comprises an outwardly directed flange at each end thereof to form said annular chambers.

References Cited

UNITED STATES PATENTS

| | | | |
|---|---|---|---|
| 2,640,322 | 6/1953 | Puerner | 180—79.2 X |
| 2,683,348 | 7/1954 | Petry | 91—51 |
| 2,707,375 | 5/1955 | Hammond. | |
| 2,788,770 | 4/1957 | Folkerts | 91—376 X |
| 3,056,461 | 10/1962 | Quayle | 180—79.2 X |
| 3,160,071 | 12/1964 | Kandelman | 91—51 |

FOREIGN PATENTS 817,830   8/1959   Great Britain.

OTHER REFERENCES

German printed application DAS 1,066,883, October 1959, Jacottet.

LEO FRIAGLIA, Primary Examiner

JOHN A. PEKAR, Assistant Examiner

U.S. Cl. X.R.

60—52; 91—376, 431; 180—79.2